United States Patent
Schorman

Patent Number: 5,224,121
Date of Patent: Jun. 29, 1993

[54] ROLLING SYNTHESIZER METHOD FOR BASEBAND SLOW FREQUENCY HOPPING

[75] Inventor: Eric Schorman, Bedford, Tex.

[73] Assignee: Motorola, Inc., Schaumburg, Ill.

[21] Appl. No.: 894,305

[22] Filed: Jun. 4, 1992

[51] Int. Cl.$^5$ ............................................... H04K 1/00
[52] U.S. Cl. ......................................... 375/1; 380/34; 455/33.1; 455/33.2
[58] Field of Search ............ 455/132, 140, 228, 277.1, 455/33.1, 33.3; 375/1; 380/34; 370/58.2, 50, 58.3, 60.1, 94.1; 379/59, 60

[56] References Cited

U.S. PATENT DOCUMENTS

| | | | |
|---|---|---|---|
| 4,222,115 | 9/1980 | Cooper et al. | 375/1 |
| 4,403,343 | 9/1983 | Hamada | 455/140 X |
| 4,479,226 | 10/1984 | Prabhu et al. | 375/1 |
| 4,545,059 | 10/1985 | Spinks, Jr. et al. | 375/1 |
| 4,578,819 | 3/1986 | Shimizu | 455/135 |
| 5,142,534 | 8/1992 | Simpson et al. | 370/50 X |

Primary Examiner—Tod R. Swann
Attorney, Agent, or Firm—Jon P. Christensen

[57] ABSTRACT

A method and apparatus is offered of exchanging a communicated signal at a base site with a communication unit on an indexed frequency of a frequency hopping communication system. The method includes the steps of transceiving, through a first base site transceiver, a first communicated signal within a first frame on a first frequency of the indexed frequency; and, while transceiving within the first frame, tuning a second, extra base site transceiver to an indexed frequency of a second frame. The second transceiver may then be used to transceive a signal within the second frame while the first transceiver is tuned to the next indexed frequency. Additional communication units may be added by adding one base site transceiver per communication unit while maintaining a single extra transceiver per frame. The extra transceiver, during each frame, is tuned to the next frequency in the frequency hopping sequence and indexing the communication units, transceiving from within different steps of the sequence, from transceiver to transceiver.

20 Claims, 2 Drawing Sheets

ROLLING SYNTHESIZER METHOD FOR BASEBAND SLOW FREQUENCY HOPPING

FIELD OF THE INVENTION

The field of the invention relates to communication systems and in specific to cellular communication systems.

BACKGROUND OF THE INVENTION

Cellular communication systems are known. Such systems are typically made up of a number of substantially continuous service coverage areas (cells) within which a mobile communication unit may receive communication services through a centrally located base site of a nearby cell. Base sites, of the system, are typically under the control of a central controller which may interconnect with a public switch telephone network (PSTN). In addition to routing of calls between mobiles in different cells, or between a mobile and PSTN subscriber, the central controller also controls and facilitates handoffs of mobiles between adjacent cells. The Groupe Special Mobile (GSM) Pan-European digital cellular system, as specified in GSM recommendations available from the European Telecommunications Standards Institute (ETSI) and incorporated herein by reference, is an example of just such a system.

Communication services within a cellular system are typically provided within a frequency spectrum reserved for cellular services. Communicated signals are typically exchanged between a mobile and a base site using a radio frequency (RF) signal. The signal is typically exchanged over a frequency pair (transmit and receive) referred to, generally, as a communication resource. The frequency pair of the communication resource allow duplex communication from mobile to base on an inbound channel and from base to mobile on an outbound channel.

Information exchanged over a communication resource between mobile and base site may be exchanged under a number of communication protocols. Examples include frequency division multiple access (FDMA), time division multiple access (TDMA), or code division multiple access (CDMA). CDMA, in turn, may be divided into direct sequence spread spectrum (DSSS) or frequency hop.

CDMA systems allow for multiple, simultaneous users of the same spectrum through use of spreading codes that are identical among communicating transceivers but different among competing transceivers. In the case of slow frequency hopping communication systems, the spreading code is a unique sequence of communication resources over which a communication unit and base site hop, exchanging a signal on each communication resource for only a short period before hopping to the next resource. During the short period on each resource a frame of information is exchanged between base site and mobile before the communicating transceivers index, synchronously, to another resource in the sequence. Since each resource is used for only a short period and since each sequence may be different, a number of competing transceivers may coexist within the same spectrum.

The exchange of signals, at a base site, between communication units and base sites under frequency hopping may occur under a number of different methods. Under one method (referred to as baseband hopping) a number of transceivers, equal in number to the hopped frequencies, and a matrix switch are provided at a base site in support of frequency hopping. Having an equal number of transceivers as hopped frequencies allows the transceivers to be individually tuned to each of the hopped frequencies and for the transceivers to be selected individually, by the matrix switch, under the spreading code for the communication transaction. Upon selecting a transceiver the matrix switch transceives a communicated signal with the communication unit for a single frame before selecting another base site transceiver for exchange of another frame.

In other frequency hopping systems a single base site transceiver is assigned per communication transaction. The transceiver, in such a case, is programmed to index along with the communication unit through the sequence of frequencies allocated to the communication transaction.

While the use of a single base site transceiver per communication transaction works well in the simple case, problems may be experienced where a number of communicated signals are exchanged per frame under a time division multiplexed (TDM) format or where hopping occurs very rapidly. In either case less time per TDM slot or per frame may be available for the exchange of information. Synthesizer settling time of the base site transceiver, in such case, becomes a significant problem in the reliable exchange of information.

While providing a number of transceivers equal to hopped frequencies at a base site (as in baseband hopping) may be a solution to the synthesizer settling problem, considerable expense is involved. In lightly loaded systems, with few users, the baseband transceivers can remain unused much of the time. Because of the need for reliable communication networks a need exists for a more efficient method of operating base site transceivers in dynamically loaded frequency hopped communication systems.

SUMMARY OF THE INVENTION

A method and apparatus is offered of exchanging a communicated signal at a base site with a communication unit on an indexed frequency of a frequency hopping communication system. The method includes the steps of transceiving, through a first base site transceiver, a first communicated signal within a first frame on a first frequency of the indexed frequency; and, while transceiving within the first frame, tuning a second base site transceiver to an indexed frequency of a second frame. The second transceiver may then be used to transceive a signal within the second frame while the first transceiver is tuned to the next indexed frequency.

DETAILED DESCRIPTION OF THE PREFERRED EMBODIMENT

The solution to the problem of providing baseband hopping in a system with less transceivers than hopped frequencies lies, conceptually, in providing an extra base site transceiver per frame, and tuning the extra transceiver to the next hopped frequency in the hopped sequence. As the hopping communication unit vacates a transceiver to select the next frequency in the hopping sequence the vacated transceiver becomes the extra transceiver which may, then, be tuned during the idle frame for the next frequency in the sequence.

Figure 1:
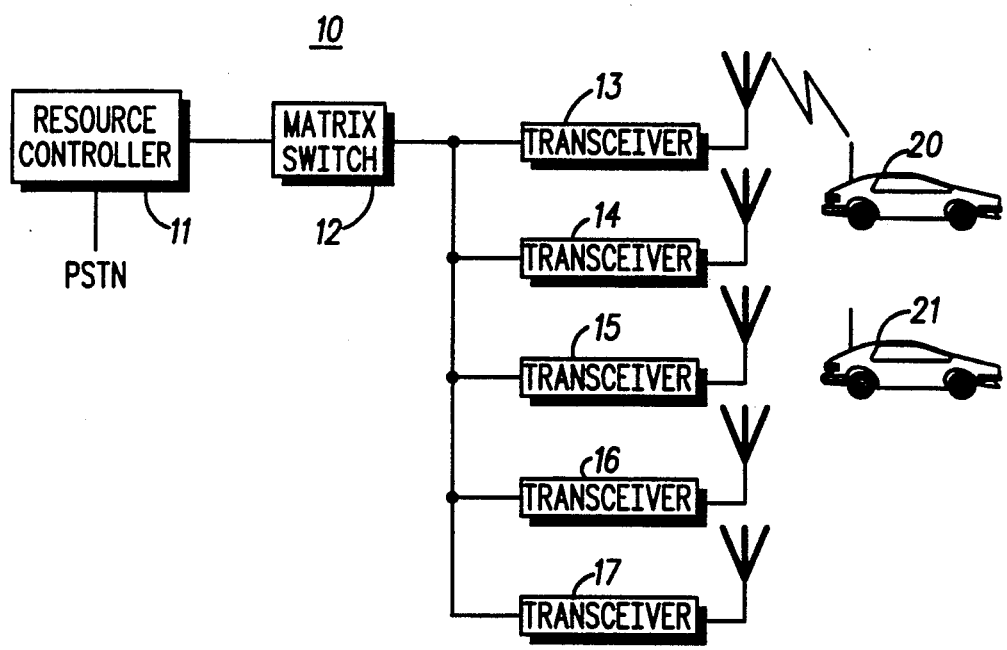
FIG. 1 comprises a block diagram of a communication system in accordance with the invention.
Figure 2:
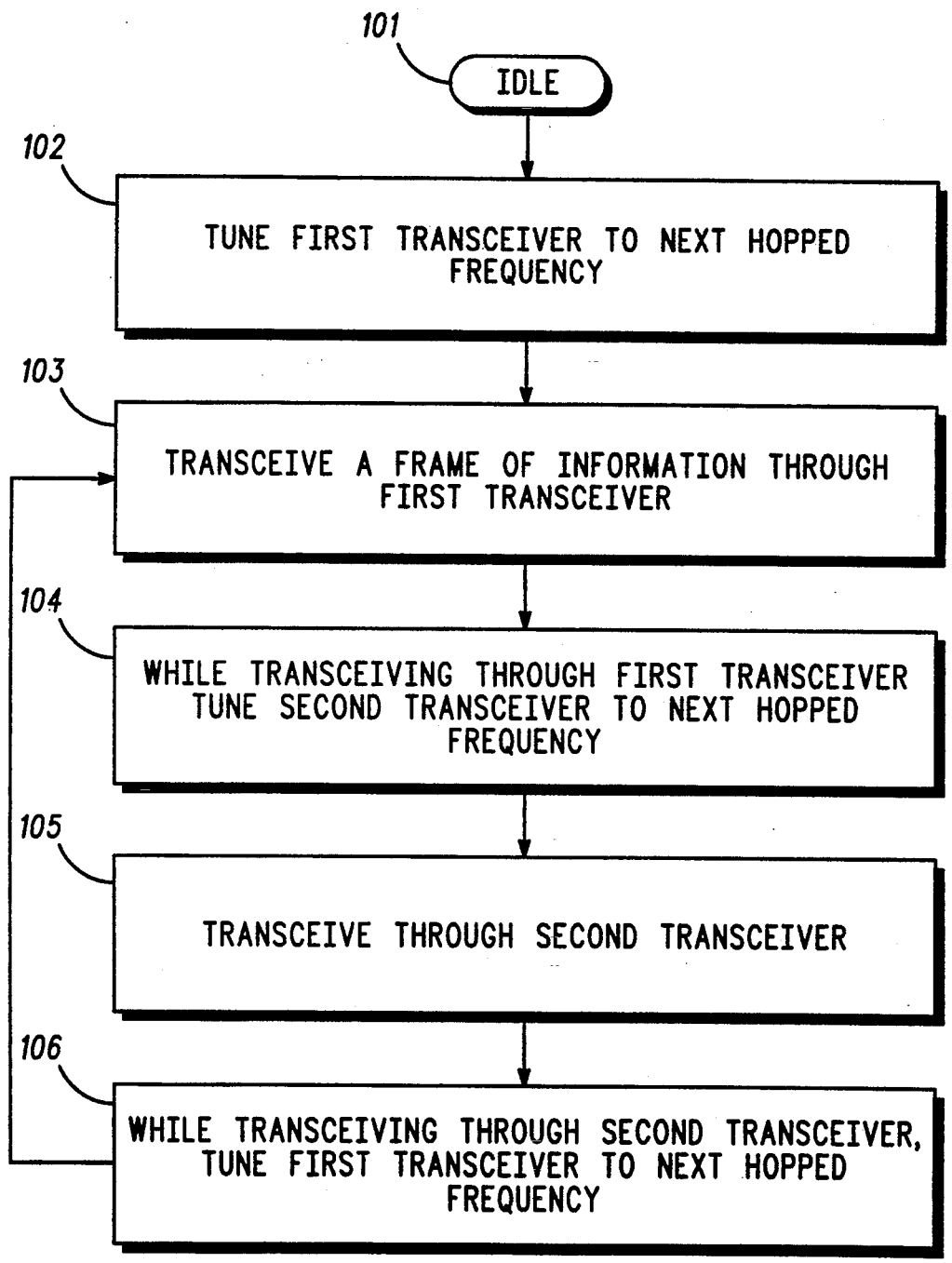
FIG. 2 illustrates a method of tuning transceivers in accordance with an embodiment of the invention.

Shown in FIG. 1 is a frequency hopping communication system, generally, (10) in accordance with the invention. The communication system (10), as shown, supports four voice channels. Included within such a system (10) is a resource controller (11), matrix switch (12), and transceivers (13-17). The resource controller (11) is shown having an interconnect with a public switch telephone network (PSTN). Also included within such a system (10) are a number of communication units (20-21) (as used herein communication units means mobile units, portable units, or fixed units).

It is assumed that control within the system (10) is asserted as under any of a number of prior art methods. For example, under GSM, a non-hopping control channel is provided which identifies a random access control channel for transmitting access requests. The communication unit upon receiving an access grant is assigned to a set-up channel where the communication unit may receive a list of hopping frequencies in preparation for transition to a hopping traffic channel.

Under other systems, access is provided over a hopping control channel. The communication unit (20-21), in such a system, contains several lists of hopping frequencies, and the sequence of use of such frequencies, within a memory (not shown) of the communication unit (20-21). The communication unit (20-21), upon seeking access, monitors a channel for a control signal from a nearby base site. Upon detecting a frame of information from a nearby base site, the content of the frame determines which list (set of hopping frequencies) a communication unit will use in accessing the system (10). The communication unit upon detecting the frame of information knows, by reference to the contents of the received frame and memory, where to locate the next hopped frequency of the hopping control channel.

In general, a request from a communication unit (20) for access to a PSTN subscriber is received at the base site through transceivers (13-17). Resource grants made by the resource controller (11) are transmitted to a requesting communication unit (20-21) through transceivers (13-17).

Included within the resource grant, under the preferred embodiment of the invention, is an identifier of a list of frequencies $(f_1-f_n)$ of a traffic channel. A requesting communication unit (20), upon identification of the list of frequencies, tunes to the first frequency $(f_1)$ in anticipation of exchange of a communicated signal with the system (10). The resource controller (11) in support of the communication transaction allocates two transceivers (13 and 14) in support of the transaction and programs the first transceiver (13) (102) to tune to the first frequency (f1). The resource controller programs the matrix switch (12) to select the first transceiver (13) for the first frame of the communicated signal. The resource controller also allocates a signal path between the matrix switch (12) and PSTN subscriber (not shown).

The first transceiver (13) immediately tunes to the first frequency $(f_1)$ in the frequency hopping sequence and exchanges (103) the first frame with the requesting communication unit (20).

While the first transceiver (13) is exchanging the first frame the second transceiver (14) tunes (104) to the second frequency $(f_2)$ of the frequency hopping sequence. During the second frame the second transceiver (14) exchanges (105) the communicated signal with the requesting communication unit (20). During the second frame the matrix switch (12) selects the second transceiver (14) as the path for the communicated signal between the communication unit (20) and PSTN subscriber.

While the second transceiver (14) is exchanging the second frame of information with the communication unit (20) the first transceiver (13) tunes (106) to the third frequency $(f_3)$ of the frequency hopping sequence. During the third frame the matrix switch (12) selects the first transceiver (13) and the signal path between the communication unit and PSTN subscriber. During the third frame the second transceiver (14) tunes to the frequency of the fourth frame $(f_4)$ and the process continues.

If a call from a requester in another system (10) or from another PSTN subscriber were to be directed to another, target communication unit (21) then the process would be continued. Since the extra transceiver (13 and 14) is already present within the continuing communication transaction a second communication transaction would require only a single additional transceiver (15).

In support of the second communication transaction the resource controller (11) would allocate an identical hopping sequence $(f_1-f_n)$ to the target communication unit (21) as the communication unit (20) of the first communication transaction but offset in time by one frame. If the communication unit (20) of the first transaction were transceiving through the first transceiver (13), in frame number m, on hopping frequency $f_m$ of the hopping sequence $(f_1-f_n)$ then the target communication unit (21) of the second transaction would transceive through the second transceiver (14) on hopping frequency $f_{m-1}$ and the third transceiver (15) would become the extra transceiver. The matrix switch (12) would choose a signal path between the communication unit (20) of the first transaction and PSTN target through the first transceiver (13). The matrix switch (12) would select a signal path for the second transaction through the second transceiver (14).

As above, while the communication unit (20) of the first transaction is transceiving frame number m through the first transceiver (13) the extra transceiver (15) is tuning to the next frequency in the hopping sequence $(f_{m+1})$. During the m+1 frame the communication unit (20) of the first transaction communicates through the third transceiver (15) and the communication unit (21) of the second transaction communicates through the first transceiver (13). During the m+1 frame the second transceiver becomes the extra transceiver which during the m+1 frame tunes to the frequency of the m+2 frame.

In another embodiment of the invention the system (10) is operated as a TDM/TDMA system. Within such a system each frame exchanged on each hopped frequency is divided into N slots. The N slots may be individually assigned to requesting communication units (20-21). The system (10) under such an embodiment, and in accordance with the invention, would support as many as 4N voice channels.

I claim:

1. A method of exchanging a communicated signal at a base site with a communication unit on an indexed frequency of a frequency hopping communication system, such method comprising the steps of: transceiving, through a first base site transceiver, a first communicated signal within a first frame on a first frequency of the indexed frequency; while transceiving within the first frame, tuning an at least second base site transceiver to an indexed frequency of a second frame; and transceiving the first communicated signal through the at least second base site transceiver during the second frame.

2. The method as in claim 1 further including transceiving, simultaneously with the first frame of the first communicated signal, a first frame of an at least second communicated signal on an at least second, indexed resource with an at least second communication unit through an at least third base site transceiver at the base site.

3. The method as in claim 2 further including transceiving the at least second communicated signal through the first base site transceiver during the second frame.

4. The method as in claim 3 further including, during the second frame, re-tuning the at least third base site transceiver to an indexed frequency of the first communicated signal for a third frame.

5. The method as in claim 4 further including exchanging the first communicated signal through the at least third base site transceiver during the third frame.

6. A method of transceiving a communicated signal at a base site in a communication system having an at least one communication unit exchanging the communicated signal through the base site on an indexed frequency of a first frequency hopping communication resource, such method comprising the steps of: transceiving the communicated signal on a first frequency of the indexed frequency of the first frequency hopping communication resource during a first frame through a first base site transceiver; during the first frame, tuning a second base site transceiver to a second frequency of the indexed frequency of the first frequency hopping communication resource for a second frame; exchanging the communicated signal through the second base site transceiver during the second frame; and, during the second frame tuning the first base site transceiver to an indexed frequency on the communication resource for an at least third frame.

7. The method as in claim 6 further including transceiving, simultaneously with the first frame of the first communicated signal, a first frame of an at least second communicated signal on an at least second, indexed resource with an at least second communication unit through an at least fourth base site transceiver at the base site.

8. The method as in claim 7 further including transceiving the at least second communicated signal through the first base site transceiver during the second frame.

9. The method as in claim 8 further including, during the second frame, re-tuning the at least third base site transceiver to an indexed frequency of the first communicated signal for a third frame.

10. The method as in claim 9 further including defining the third frame as the frame number equal to the number of simultaneous communicated signals plus one.

11. A method of transceiving communicated signals at a base site in a communication system having at least one communication unit exchanging a communicated signal through the base site on an indexed frequency of a frequency hopping communication resource indexing through a plurality of frequencies, such method comprising the steps of: transceiving the communicated signal on a first frequency of the indexed frequency of the frequency hopping communication resource during a first frame through a first base site transceiver; during the first frame, tuning an at least second base site transceiver to a second frequency of the indexed frequency of the frequency hopping communication resource for a second frame; exchanging the communicated signal on the communication resource through the at least second base site transceiver on the indexed frequency during a second frame, first following the first frame; and, alternately tuning the first base site transceiver and the second base site transceiver to an indexed frequency of the communication resource during subsequent frames.

12. An apparatus for exchanging a communicated signal at a base site with a communication unit on an indexed frequency of a frequency hopping communication system, such apparatus comprising: means for transceiving, through a first base site transceiver, a first communicated signal within a first frame on a first frequency of the indexed frequency; means for tuning, while transceiving within the first frame, an at least second base site transceiver to an indexed frequency of a second frame; and means for transceiving the first communicated signal through the at least second base site transceiver during the second frame.

13. The apparatus as in claim 12 further comprising means for transceiving, simultaneously with the first frame of the first communicated signal, a first frame of an at least second communicated signal on an at least second, indexed resource with an at least second communication unit through an at least third base site transceiver at the base site.

14. The apparatus as in claim 13 further comprising means for transceiving the at least second communicated signal through the first base site transceiver during the second frame.

15. The apparatus as in claim 14 further comprising means for re-tuning, during the second frame, the at least third base site transceiver to an indexed frequency of the first communicated signal for a third frame.

16. The apparatus as in claim 15 further comprising means for exchanging the first communicated signal through the at least third base site transceiver during the third frame.

17. An apparatus for transceiving a communicated signal at a base site in a communication system having an at least one communication unit exchanging the communicated signal through the base site on an indexed frequency of a first frequency hopping communication resource, such apparatus comprising: means for transceiving the communicated signal on a first frequency of the indexed frequency of the first frequency hopping communication resource during a first frame through a first base site transceiver; means for tuning, during the first frame, a second base site transceiver to a second frequency of the indexed frequency of the first frequency hopping communication resource for a second frame; means for exchanging the communicated signal through the second base site transceiver during the second frame; and, means for tuning, during the second frame, the first base site transceiver to an indexed frequency of the first frequency hopping communication resource for an at least third frame.

18. The apparatus in claim 17 further comprising means for transceiving, simultaneously with the first frame of the first communicated signal, a first frame of an at least second communicated signal on an at least second, indexed resource with an at least second communication unit through an at least fourth base site transceiver at the base site.

19. The apparatus as in claim 18 further comprising means for transceiving the at least second communicated signal through the first base site transceiver during the second frame.

20. The apparatus as in claim 19 further comprising means for re-tuning, during the second frame, the at least third base site transceiver to an indexed frequency of the first communicated signal for a third frame.

* * * * *